(12) United States Patent
Lang

(10) Patent No.: US 12,324,074 B2
(45) Date of Patent: Jun. 3, 2025

(54) HCL DAYLIGHT HARVESTING WITH DYNAMIC TARGET FOR LIGHT INTENSITY

(71) Applicant: LEDVANCE GmbH, Garching bei München (DE)

(72) Inventor: Dieter Lang, Bruckmühl (DE)

(73) Assignee: LEDVANCE GMBH, Garching Bei Munchen (DE)

( * ) Notice: Subject to any disclaimer, the term of this patent is extended or adjusted under 35 U.S.C. 154(b) by 0 days.

(21) Appl. No.: 18/443,998

(22) Filed: Feb. 16, 2024

(65) Prior Publication Data
US 2024/0284577 A1 Aug. 22, 2024

(30) Foreign Application Priority Data
Feb. 20, 2023 (DE) .......................... 102023104073.1

(51) Int. Cl.
*H05B 47/16* (2020.01)
*F21V 23/00* (2015.01)
*H05B 47/11* (2020.01)
*H05B 47/155* (2020.01)
*F21Y 113/10* (2016.01)

(52) U.S. Cl.
CPC ........... *H05B 47/16* (2020.01); *F21V 23/003* (2013.01); *H05B 47/11* (2020.01); *H05B 47/155* (2020.01); *F21Y 2113/10* (2016.08)

(58) Field of Classification Search
CPC ...... H05B 47/11; H05B 47/155; H05B 47/16; F21V 23/003; Y02B 20/40
See application file for complete search history.

(56) References Cited

U.S. PATENT DOCUMENTS

| 2016/0007426 | A1 | 1/2016 | Ashdown et al. |
| 2022/0104321 | A1* | 3/2022 | Sooch ............... H05B 47/16 |
| 2022/0279634 | A1* | 9/2022 | Upton ............... H05B 47/16 |

FOREIGN PATENT DOCUMENTS

| DE | 102011075116 A1 | 11/2012 |
| DE | 102013208905 A1 | 11/2014 |
| DE | 102020105332 A1 | 9/2021 |

* cited by examiner

*Primary Examiner* — Karabi Guharay
(74) *Attorney, Agent, or Firm* — Hayes Soloway PC

(57) ABSTRACT

A lighting system for illuminating an environment is provided. The lighting system comprises at least one controllable light source for generating a light with at least one controllable light parameter, at least one light sensor for detecting a current lighting level in the environment, and a control unit for controlling the at least one light source, wherein the control unit is configured to evaluate sensor data received from the at least one light sensor to determine a current daylight level and to control the at least one controllable light source using a predefined HCL target curve and based on the determined current daylight level. Furthermore, a method for illuminating an environment is provided.

11 Claims, 3 Drawing Sheets

HCL DAYLIGHT HARVESTING WITH DYNAMIC TARGET FOR LIGHT INTENSITY

CROSS-REFERENCE TO RELATED APPLICATIONS

This patent application claims the benefit of and priority to German Patent Application No. 102023104073.1, filed on Feb. 20, 2023, which is herein incorporated by reference in its entirety.

FIELD OF THE DISCLOSURE

The present disclosure generally relates to lighting systems. Furthermore, the present disclosure relates to methods for illuminating an environment.

BACKGROUND

Lighting systems are known, in particular so-called Human Centric Lighting (HCL) lighting systems, which are designed to provide lighting in an environment that is adapted to human needs. In particular, an HCL lighting system can be used to ensure that the lighting level or illuminance, for example measured at a workplace, changes during the course of the day. The dynamic daylight curve of such systems is usually based on the course of natural daylight, for example to support the human day-night rhythm and create optimized working conditions.

SUMMARY

To increase the energy efficiency of lighting systems, attempts are made to reduce the energy required for lighting by utilizing daylight, which is known as daylight harvesting (DLH). However, existing HCL lighting systems do not allow satisfactory use of daylight.

One object of the embodiments of the present disclosure is to provide a lighting system and a method for illuminating an environment that enables efficient utilization of daylight in lighting.

To solve this problem, a lighting system is proposed according to a first aspect. The lighting system comprises at least one controllable light source for generating a light with at least one controllable light parameter. The at least one light source can be designed in particular as an LED light source with one or more LED light sources and with an LED driver. The lighting system can be designed in particular as an HCL-capable lighting system and designed to illuminate an environment or a room, in particular a living or working space and/or workplace, with a lighting level or illuminance that can be set, in particular according to a predefined HCL target curve. The HCL target curve can, in particular, specify a temporal progression of lighting parameters, such as lighting level or illuminance and/or color temperature.

The lighting system further comprises at least one light sensor for detecting a current lighting level in the environment and a control unit for controlling the at least one light source, wherein the control unit is configured to evaluate sensor data received from the at least one light sensor to determine a current daylight level relevant for the environment and to control the at least one controllable light source on the basis of a predefined or stored HCL target curve, which specifies a temporal progression of lighting parameters, and on the basis of the determined current daylight level, so that the resulting lighting level in the environment is controlled on the basis of a predefined or stored HCL target curve. The daylight level can essentially be characterized by the illuminance in the environment. In particular, the control unit can comprise a processor, a memory unit for storing data and machine-readable instructions for the processor and an interface for receiving sensor data or signals. The predefined HCL target curve can be stored in the memory unit of the control unit. In particular, the HCL target curve may represent a target illuminance or a target lighting level as a function of time of day and may be stored as a table in the memory unit. In some embodiments, the memory unit may be configured to store multiple HCL curves so that the user can select an HCL curve, for example, by actuating a user interface. Current systems using DLH have a constant target lighting level, which is in conflict with the desire to realize a dynamic lighting situation with HCL. The option of using different HCL curves is also not possible if the DLH control regulates to a constant target lighting level. For this reason, DLH and HCL are not used together or their function is restricted.

By taking the current daylight level into account, the light intensity that has to be provided by the lighting system can be reduced, although the target intensity of the lighting according to the HCL target curve is still achieved due to the utilization of the available daylight. The target intensity or the target lighting level according to the specified HCL curve can therefore be achieved with lower energy consumption.

The control unit can also be configured to essentially continuously adjust the target lighting level to be generated by the at least one light source based on the current daylight level. Due to the essentially continuous adjustment of the target level or the target intensity of the lighting system, the DLH efficiency can be further increased. In particular, the control unit can be configured to read out a new target value for the illuminance from the memory unit repeatedly or at short intervals, to form a difference between the new target value and the current daylight level and to control the at least one light source with a correspondingly reduced output. The lighting level generated by the at least one light source can be reduced by the amount of available daylight or by a usable portion thereof. The daylight present in the surroundings is thus largely utilized to reduce the light output of the at least one light source. By utilizing the daylight or daylight harvesting (DHL), the energy consumption of the lighting system can thus be further reduced.

The control unit can be configured to calibrate the light sensor using sensor data recorded at different illuminance. In particular, the sensor data recorded at different illuminance and otherwise under the same conditions can be used to calculate out the influence of the daylight level in particular for precise calibration of the light sensor.

In some embodiments, the control unit is configured to evaluate the sensor data taking into account a spectral characteristic of the at least one light sensor. In particular, the at least one light sensor can have a light sensitivity that is dependent on the spectral properties of the light, such as color temperature or CCT (correlated color temperature) or wavelength. In particular, this dependency of the light sensor can be stored in the memory unit so that it can be taken into account when the sensor data is evaluated by the control unit. This dependency can be determined and stored during a calibration routine.

The at least one light source can comprise at least one cool white light source with a first color temperature (CCT1) and at least one warm white light source with a second color temperature (CCT2), wherein the control unit can be configured to approximate a CCT dependence of the at least one light sensor in the range between the first color temperature and the second color temperature as a linear function of the color temperature in the simplest case. The linear approximation of the CCT dependence of the sensor makes it possible to determine the lighting level at different color temperatures with a high degree of accuracy.

According to a second aspect, a method for illuminating an environment by means of a lighting system with at least one controllable light source, with at least one light sensor for detecting a current lighting level in the environment and with a control unit for controlling the at least one light source is provided.

According to the method, a first target value is read off at an HCL target curve to determine a first target lighting level at a first point in time or is determined by calculation. The predefined HCL target curve can in particular be stored as a table in a memory unit of the control unit. In a method step, the at least one light sensor is used to detect a current lighting level in order to determine a current daylight level. In a further method step, a second target value is read off at the HCL target curve to determine a second target lighting level at a second point in time.

In a subsequent method step, the second target lighting level is adjusted taking into account the determined daylight level currently present in the environment. The at least one light source is then controlled to adjust the lighting system in accordance with the adjusted second target lighting level. These method steps can be repeated several times so that the setting of the lighting system can be adapted to the currently usable daylight level. By taking the current daylight level into account, the desired lighting level can be achieved with a reduced light output or lower energy consumption.

The method can include the determination of a usable or for DLH usable proportion of the currently available daylight. When controlling the at least one light source, the actually usable proportion of daylight can thus be taken into account, which can increase the setting accuracy of the HCL target curve by utilizing the daylight.

Adjusting the second target lighting level can involve subtracting a daylight level, taking into account the usable proportion of the currently available daylight, from the second target lighting level determined using the HCL target curve. By subtracting the currently usable daylight level from the second target lighting level, the target lighting level to be generated by the lighting system can be precisely determined.

Reading a target value from the HCL target curve can in particular comprise reading a percentage value or percentage target value, wherein the method can also comprise converting the percentage target value into illuminance, in particular into lux, and temporal interpolation of tabulated values. In particular, the HCL target curve can be stored as a normalized curve or table in the memory unit of the control unit. The current daylight level recorded by the sensor can also be recorded or converted as illuminance (in lux) so that the daylight level can be subtracted directly from the determined target lighting level. A conversion is generally necessary because the light sensor detects the light level at a different location in the environment (e.g., on the ceiling) than the location that is relevant for the target level (e.g., the work surface).

The method can also include calibration of the at least one light sensor. In particular, sensor data that has been recorded at different illuminance levels and for tunable white systems at different set color temperatures and otherwise under the same conditions can be used for calibration, in particular to calculate out the influence of the daylight level for precise calibration of the light sensor.

The invention will now be explained in more detail with reference to the attached figures. The same reference symbols are used in the figures for identical or similarly acting parts.

DETAILED DESCRIPTION

Figure 1:
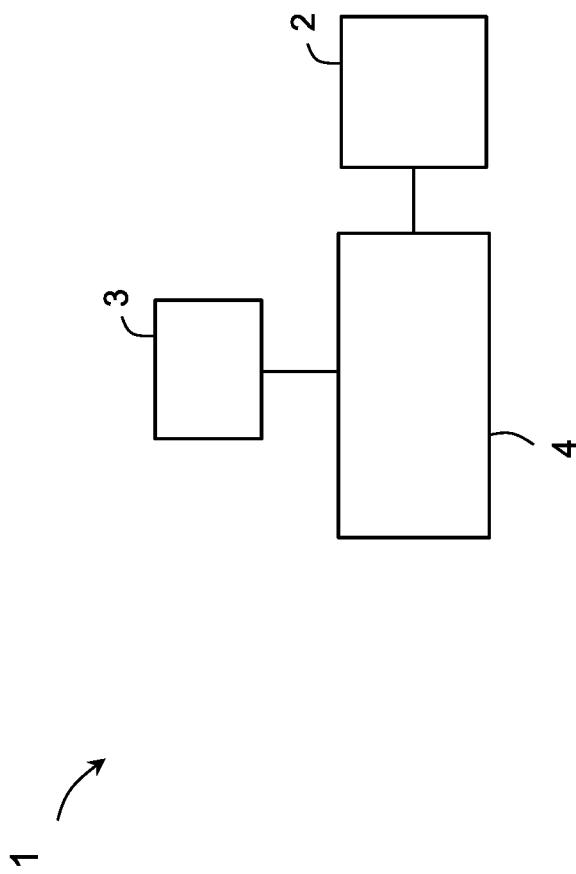
FIG. 1 schematically shows a lighting system according to an embodiment example.

FIG. 1 schematically shows a lighting system according to an embodiment example. The lighting system 1 comprises a controllable light source 2, a light sensor 3 and a control unit 4 for controlling the controllable light source 2. The lighting system 1 is designed as an HCL-capable system or HCL system. In particular, the lighting system 1 is designed to provide the controllable light source 2 for providing lighting according to a predetermined HCL target curve or according to a predetermined temporal progression. In particular, the lighting system can be designed as a network-compatible system that can be operated in an HCL application using standardized interfaces or protocols, such as BIOLUX, VIVARES, and/or ZigBee. VIVARES DALI BIOLUX® is a registered trademark of LEDVANCE GmbH. VIVARES® is a registered trademark of LEDVANCE GmbH. ZigBee® is a registered trademark of the ZigBee Alliance. DALI® (Digital Addressable Lighting Interface) is a registered trademark of the international standardization consortium for lighting and building automation networks.

In particular, the light source 2 may comprise one or more LED light sources with adjustable light parameters, such as luminous flux, color temperature and/or radiation characteristics. The control unit 4 comprises a processor (not shown), an interface (not shown) for receiving sensor data or signals and a memory unit (not shown) for storing data and machine-readable instructions for the processor. In particular, the memory unit can be designed to store one or more HCL target curves, for example as table values, wherein it is possible to switch between the different curves either by user intervention or in a controlled manner.

The control unit 4 can be configured or the memory unit can contain instructions for the processor to evaluate sensor data received from the light sensor 3 to determine a current daylight level and to control the light source 2 using a predefined HCL target curve or HCL target curve stored in the memory unit and based on the determined current daylight level.

In some embodiments, the control unit 4 is configured to substantially continuously adjust the target lighting level to be generated by the light source 2 based on the current daylight level.

The control unit 4 can also be configured to calibrate the light sensor on the basis of sensor data recorded at different lighting levels. In some embodiments, the control unit 4 is configured to evaluate the sensor data taking into account a spectral characteristic of the light sensor.

In some embodiments, the lighting system 1 has several controllable light sources. In particular, the lighting system 1 may comprise at least one cool white light source with a first color temperature (first channel) and at least one warm white light source with a second color temperature (second channel). The control unit 4 may be configured to approximate a CCT dependency of the light sensor between the first color temperature and the second color temperature as a linear function of the color temperature. By assuming a linear CCT dependence of the light sensor, the computational effort required to evaluate the sensor data can be reduced. For example, if the lighting system 1 generates an illuminance of 1050 lx with a cool white light with a CCT of 6500 K at a power level of 100%, the sensor may incorrectly display or measure an illuminance of 1250 lx. If the lighting system 1 generates an illuminance of 950 lx with a warm white light with a CCT of 2700 K at a power level of 100%, the sensor may incorrectly display an illuminance of 900 lx. These measured deviations can be used to calculate correction factors for the sensor measurements in warm white and cool white light. For example, if the sensor detects an illuminance of 500 lx in cool white light, the actual or corrected illuminance can be determined as follows:

$$(1050/1250) * 500 lx = 420 lx.$$

If the sensor detects an illuminance of 500 lx with warm white light, the actual intensity can be determined as:

$$(950/900) * 500 lx = 528 lx.$$

In percentage terms, the sensor output in the cool white range (1% CW) corresponds to a measured illuminance of 1250 lx/100=12.5 lx. The actual illuminance after correction is 10.5 lx per percentage.

One percent of the sensor output in the warm white range (1% WW) corresponds to a sensor output of 950 lx/100=9.5 lx.

A linear approximation of the CCT dependence of the sensor sensitivity in the CCT range between 2700 K and 6500 K has proven to be sufficiently precise.

For example, the lighting system 1 can be operated at a specific color temperature CCT with a light output that is a fraction ("percentage") of a maximum light output. In particular, the color temperature CCT can lie between the first color temperature CCT1 of 6500 K (of the first channel) and the second color temperature CCT2 of 2700 K (of the second channel). With a linear approximation of the CCT dependency of the sensor, the following results for the sensor output value:

$$Sens(CCT) = \text{Percentage} * [6500\,K - CCT)/(6500\,K - 2700\,K) * 1\%\ WW +$$
$$(CCT - 2700\,K)/(6500\,K - 2700\,K) * 1\%\ CW].$$

For example, if the output power is set to 80% at 4000 K, the sensor would output a value of 842 lx. At 2700 K, this would result in 760 lx, and at 6500 K, an illuminance of 1000 lx. As the setting of the system with regard to percentage and CCT is known at all times, the proportion of a measured sensor value in the lighting level generated by at least one light source at different color temperatures can be precisely determined. The difference to the measured sensor value corresponds to the additional daylight. Daylight can usually be assumed to have a color temperature of 5500 K to 6500 K, so that a correction corresponding to CCT 1 can be carried out for the remaining daylight component according to the sensor measured value in order to determine how high the daylight illuminance is. In the morning or evening, when the color temperature of the daylight can also deviate significantly from 5500 to 6500 K, an exact correction is generally not necessary, as the illuminance from daylight is very low at these times and DLH is then no longer relevant.

Figure 2:
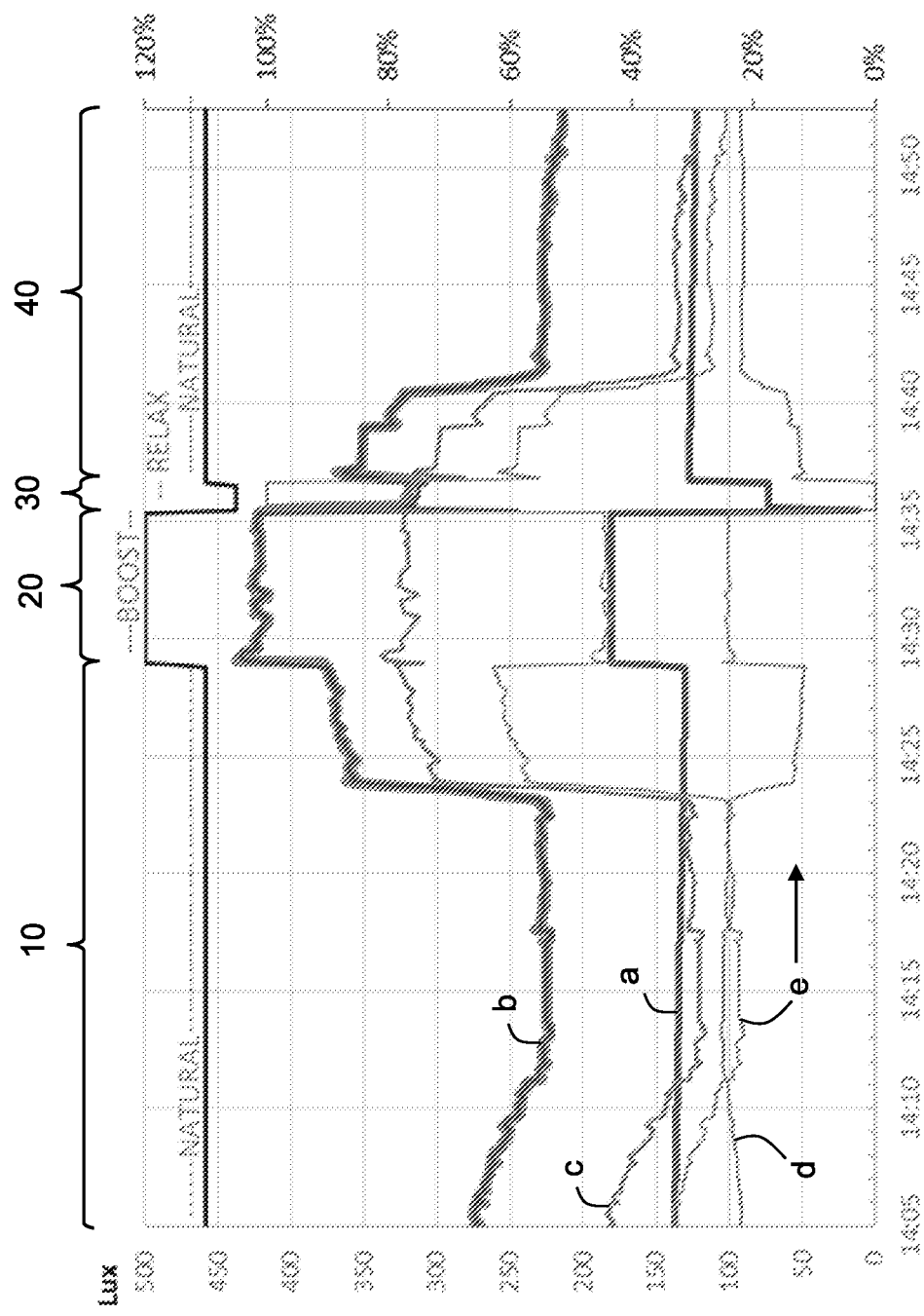
FIG. 2 shows the temporal progression of the illuminance over time according to an embodiment example.

FIG. 2 shows the temporal course of the illuminance according to an example. The time of day between 14:05 and 14:50 is plotted on the X-axis. The illuminance in lux is plotted on the left-hand Y-axis. FIG. 2 shows a (provisional) target curve or target illuminance as a function of time without taking daylight into account, shown as curve "a."

The target curve a is a theoretical or calculated curve and represents a time dependency of the illuminance to be generated by the light source 2, as the light sensor would detect it. For example, if a 100% light output of the lighting device corresponds to a sensor value of 175 lx, then the sensor could output an illuminance of 140 lx, for example on the worktable, at an 80% light output, even if the actual illuminance deviates from this.

In a time period 10 between 14:05 and 14:28, the target illuminance remains essentially constant at around 140 lx with a slightly decreasing tendency. This first time period corresponds to an operating mode of the lighting system, which is referred to as "NATURAL" in the example. In a second time period 20, the curve a shows increased illuminance, which corresponds to a "BOOST" operating mode to increase alertness. This is followed by a short relaxation phase, in a time period 30 between 14:35 and 14:37, with reduced illuminance, which corresponds to a "RELAX" operating mode. In a subsequent time period 40, the natural operating mode "NATURAL" follows again, wherein the decaying tendency is continued so that the curve a ends at around 125 lx at 14:52. How these sequences are generated and controlled and how it is possible to switch between them is disclosed in WO 2019/175403 A1 and is not the subject of the present invention, which discloses how the defined sequences also can be maintained with consideration of DLH.

The sum of the light generated by the lighting apparatus and the daylight measured by the sensor is shown in FIG. 1 as curve "b." The difference between curves b and a gives the available daylight, which is shown as curve "c" in FIG. 1. It starts at an illuminance of around 175 lx at 14:05. The change in the daylight level can be caused, for example, by the opening and closing of curtains or blinds as well as by the weather, wherein different amounts of daylight, which can also change during the course of the day, enter the room depending on the opening state of the blinds.

Theoretically, it may seem possible to utilize 100% of the available daylight. In practice, however, only a fraction of this can usually be utilized. For example, the spatial distribution of daylight and the positioning of the light sensor may mean that only a certain percentage of the available daylight can be used to reduce the lighting or artificial lighting generated by the lighting apparatus. For example, if the calculated curve c shows a value of illuminance of 175 lx as available daylight, it actually may mean that only 25% of this (i.e., 44 lx) is available to reduce the lighting level of the artificial lighting. This means that the usable daylight would only amount to 25% of the total available daylight. This percentage therefore represents the efficiency of DLH (daylight harvesting) or DLH efficiency in this case. A DLH efficiency of 100% would mean, for example, that the artificial lighting or lighting to be generated by lighting system 1 can be reduced by the full amount of measured daylight.

The exact percentage or DLH efficiency depends on the placement and geometric properties of the sensor in terms of sensitivity to the incident light. In DLH systems, such factors can be taken into account, in particular integrated or implemented as a correction factor, wherein the correction factor can be adjusted by the user if necessary.

Adjusting the DLH efficiency to lower values can also be used to give users of the system a certain "gain" in illuminance as daylight increases. This is perceived as pleasant by users, as it allows the feeling of "nice weather" with higher illuminance to be transferred to the room interior.

In terms of user acceptance of a lighting system, such measures are advantageous compared to systems that completely compensate for any increase in the light level in the interior compared to the target value when the daylight level rises.

The previous target level (curve a) in FIG. 1 is reduced according to the amount of usable daylight, which in the example shown is 25% of the available daylight. The resulting curve is shown in FIG. 1 as curve "d." Curve d starts at around 96 lx, i.e., 140 lx (curve a) minus 44 lx (25% of curve c). Curve d, therefore, represents the corrected lighting level to be generated with the lighting device or artificial lighting. A comparison of the original target curve a and curve d makes it possible to determine the light and energy savings due to DLH or daylight utilization. The temporal progression of the corresponding savings f=(a−d)/a is shown in FIG. 1 as curve "c," wherein the savings are plotted as a percentage on the right-hand Y-axis. Curve e starts at approximately 32% at 14:05 and shows the percentage saving over time. It can be converted directly into the energy savings due to the DLH.

The operation of the algorithm used in the method can be seen in the various curves in FIG. 2. At the start of the test at 14:05, the blinds are approximately 60% closed so that some daylight can enter. While the HCL target value for the NATURAL setting is almost constant from 14:05 to 14:28 (only a slight drop from 137 lx to 130 lx can be seen), the available natural daylight decreases significantly during this time from approximately 170 lx to 120 lx. Accordingly, Lux_HCL_Target_new (curve d) increases from 92 lx to 104 lx, and the associated energy saving falls from 32% to approximately 20%.

At 14:23, the blinds are fully opened so that more daylight enters the room. This is visible in a steep rise in curve c for daylight. At the same time, the amount of artificial light required to meet the HCL requirement is reduced, as shown in curve d. Even after opening the blinds, the available daylight level increases slightly due to natural changes, which leads to an additional reduction in artificial light and increased energy savings.

At 14:29, the HCL mode is set to BOOST (time period 20). This requires a higher light level. As daylight remains almost constant at this time, the higher light level is generated by artificial light. This can be seen in the Lux_HCL_Target_new (curve d), which increases.

Figure 3:
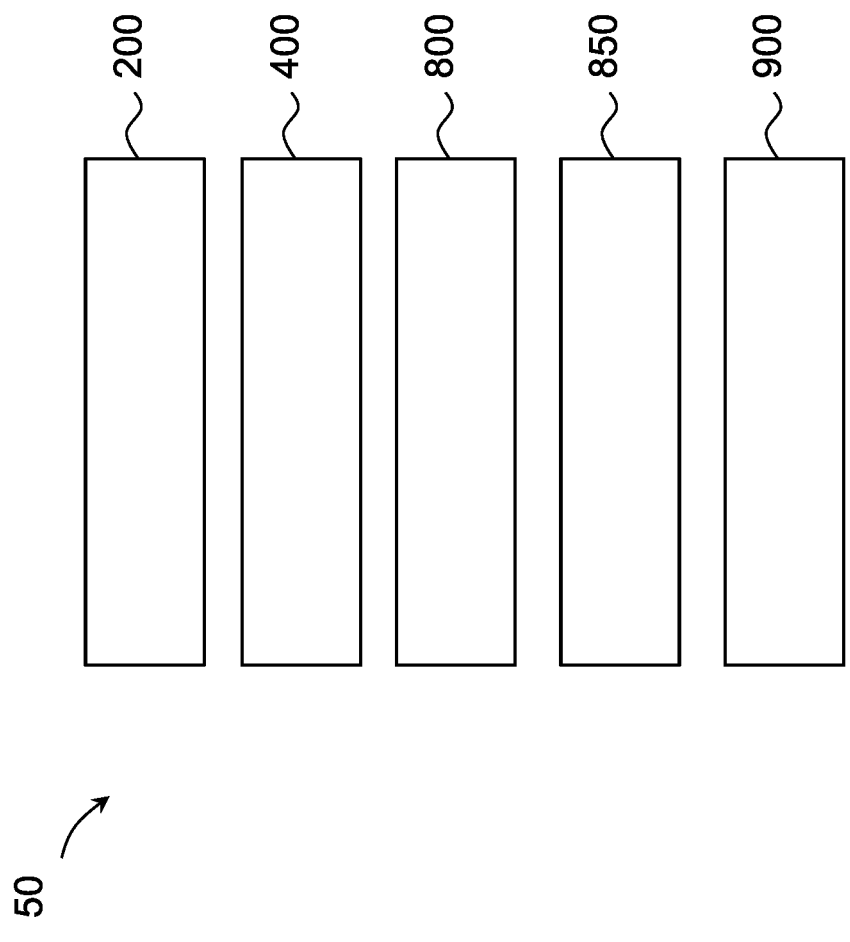
FIG. 3 shows a flow diagram of a method according to an embodiment example.

FIG. 3 shows a flowchart of a method according to an embodiment example. The method 50 may in particular be carried out by means of a lighting system according to the first aspect.

In a method step 200, a first target value is read off at a predefined HCL target curve to determine a first target lighting level at a first point in time (t1). In particular, the first target value can be read off at the HCL target curve as a percentage value (HCL_t1_Percentage), for example calculated from the internal HCL curve definition. In particular, HCL_t1_Percentage can be stored as a number between 0 and 1. The method can also include the conversion of the percentage into lux:

$$\mathrm{HCL\_t1} = DeltaS * \mathrm{HCL\_t1\_Percentage}.$$

In particular, the HCL curves can be defined by a table containing the time of day, the CCT setting for that time, and the relative intensity as a percentage for that time. The color temperature CCT also can be read out and used to set the system to the desired CCT in combination with the intensity setting, possibly taking into account the color temperature of the available daylight.

In a method step 400, the current lighting level, in particular (sensor_t1), is detected by means of the at least one light sensor to determine a current daylight level. In particular, the current lighting level can be recorded in lux. The Sensor_t1 value is made up of the contributions of the artificial lighting of the lighting system and the daylight:

$$\mathrm{Sensor\_t1} = \mathrm{HCL\_t1} + \mathrm{Daylight\_t1}.$$

In a further method step, the ratio between the artificial lighting and the daylight can be calculated. Since the amount of artificial lighting HCL_t1 is known, the result for the daylight is:

$$\mathrm{Daylight\_t1} = \mathrm{Sensor\_t1} - \mathrm{HCL\_t1}.$$

In a subsequent method step 800, a second target value is read out from the HCL target curve to determine a second target lighting level at a second point in time (t2). In particular, the next target setting of the HCL target curve at point in time t2 (HCL_t2_Percentage) can be read from the stored or defined HCL target curve and converted to a target lighting level in lux HCL_t2.

In a further method step 850, the second target lighting level is adjusted taking into account the determined currently available daylight level. The second target lighting level can be adjusted, in particular, by subtracting a currently usable daylight level from the second target lighting level determined using the HCL target curve:

$$\mathrm{HCL\_t2} = DeltaS * \mathrm{HCL\_t2\_Percentage} - \mathrm{U\_daylight\_t1}.$$

It should be noted that HCL_t2 cannot be below zero. This would mean that the light is switched off, as there is sufficient daylight available. To set the artificial light of the system to a level of HCL_t2, the system must be set to a relative value of:

$$\mathrm{HCL\_t2\_Percentage\_new} = \mathrm{HCL\_t2}/DeltaS.$$

For the next setting, the artificial light level can be reduced by a certain percentage P in relation to the existing natural daylight. This factor P or P_daylight is typically in the range from 0 to 1. It can be defined in a calibration or optimization routine, for example, and remains unchanged except in the case of recalibration, for example, after changes to the room or lighting system. If no use of daylight is planned, this factor is zero. If all available daylight is used, which is not normally the case, this factor is 100%. Among other things, this factor (P_daylight) can depend heavily on the reflection characteristics of the daylight in the room and on how the daylight level measured at the sensor correlates with the usable daylight (U_daylight) in the room:

$$U\_daylight\_t1 = Daylight\_t1 * P\_daylight.$$

In a method step 900, the at least one light source is controlled to adjust the illumination system according to the adjusted second target illumination level HCL_t2_Percentage_new.

The method steps 400 to 900 described above can be repeated in a similar manner for a third point in time:

$$Daylight\_t2 = Sensor\_t2 - HCL\_t2;$$

$$U\_daylight\_t2 = Daylight\_t2 * P\_daylight;$$

$$HCL\_t3 = DeltaaS * HCL\_t3\_Percentage - U\_daylight\_t2;$$

$$HCL\_t3\_Percentage\_new = HCL\_t3/DeltaS.$$

The lighting system can then be readjusted according to HCL_t3_Percentage_new.

In particular, these method steps can be repeated for any nth point in time or loop. Instead of t2 and t3, t(n) or t(n+1) would be displayed. t(n) or t(n+1) would then refer to measured or set values for the current or next loop.

The calculations for determining the usable proportion of daylight show the typical properties of a proportional controller (P controller), in which the control variable changes proportionally to the deviation of the measured variable from the target value. This is a simple controller, and, in practice, the properties of the controller can be changed to a proportional-integral-differential (PID) behavior. Time-dependent filter functions can also be added (e.g., band-pass or low-pass filters). These can optimize the response to changes in either the target or the measured variable, wherein daylight changes being regarded as a disturbance to the controller.

In an optimized setting, rapid changes in daylight can be ignored by a low-pass filter that does not accept too strong reactions from the lighting system if rapid changes in daylight availability, such as those caused by clouds, can trigger a too strong reaction from the system, while slow or slight changes have the desired influence on the reaction of the artificial light level. In contrast, a rapid change caused by a user interaction (e.g., dimming the target level up or down by selecting a different HCL mode) can pass a filter.

For example, if the next target level for the HCL percentage HCL_t(n+1) differs significantly from the previous level HCL_t(n), this is typically caused by such a user interaction. Usable daylight, on the other hand, is caused by slow natural changes during the course of the day or by faster changes due to clouds or light reflections or similar effects. In this case, a reaction of the system to such rapid changes is generally undesirable and should be avoided. This can be achieved, for example, by limiting U_daylight_t(n+1) to a certain level in relation to the previous level U_daylight_t(n), and/or the difference between U_daylight_t(n+1) and U_daylight_t(n) must not exceed a certain value. It is possible to allow faster reactions to a reduction in usable daylight and only slower reactions to an increase in daylight. In some embodiments, rapid changes caused by user interactions and influencing the HCL target level are allowed.

In some embodiments, two controllers with different properties are used. In this case, the equation in the method step 800

$$HCL\_t(n+1) = DeltaS * HCL\_t(n+1)\_percent - U\_daylight\_t(n)$$

is changed to the following equation:

$$HCL\_t(n+2) = DeltaS * HCL\_t(n+2) - U\_daylight\_modified\_t(n).$$

Here, DeltaS*HCL_t(n+2)_Percentage includes the rapid changes to the target (e.g., due to user interaction) and is, therefore, regulated by a proportional response. U_daylight_modified_t(n) is recalculated from U_daylight_t(n), U_daylight_t(n−1), and possibly earlier measurements in order to avoid too strong immediate reactions to daylight changes (e.g., by applying low-pass filter functions or allowing only a limited difference from U_daylight_t(n−1) to U_daylight_modified_t(n)).

In some embodiments of the method, a calibration of the light sensor is performed in a method step. In particular, the calibration can include detecting a maximum lighting level MaxS at a 100% light output of the HCL system and detecting a minimum lighting level at a 0% light output of the HCL system. The recorded illuminance values may be partly determined by the background light or daylight present in the room. The calibration also can include determining a difference DeltaS=MaxS−MinS, wherein DeltaS/100 corresponds to an illuminance that is generated at a 1% output of the HCL system. DeltaS, thus, corresponds to the sensor sensitivity.

This calibration can be performed twice for systems that can set different color temperatures (Tunable White) (e.g., at the highest color temperature (CCT1) and at the lowest color temperature (CCT2)). DeltaS(CCT1) and DeltaS(CCT2) are determined from this. This makes it possible to determine which sensor measurement value is to be expected, taking into account the CCT dependence of the sensor on the artificial light, at a certain output of the HCL system in percentage and a mixture of the different color temperature components of a tunable white system. In a simple case, the mixing proportions of the different color temperatures can be interpolated linearly. A light with a color temperature of 4000 K then would be produced by mixing 35% with CCT1=6500 K and 65% with CCT2=2700 K. However, information on a more precise luminaire-dependent mixture also can be stored in the control unit. In many systems, for example, the color temperature of 4000 K is achieved by mixing 50% each of CCT1=6500 K and CCT2=2700 K. The sensor sensitivity for any color temperature, thus, results from the proportional linear combination of DeltaS(CCT1) and DeltaS(CCT2).

Although at least one exemplary embodiment has been shown in the foregoing description, various changes and modifications may be made. Said embodiments are merely examples and are not intended to limit the scope, applicability or configuration of the present disclosure in any way. Rather, the foregoing description provides the skilled person with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be combined with each other in order to obtain further functions.

LIST OF REFERENCE SIGNS 1 lighting system
2 light source
3 light sensor
4 control unit
10 time period
20 time period
30 time period
40 time period
50 method
200 method step
400 method step
800 method step
850 method step
900 method step

What is claimed is:

1. A lighting system for illuminating an environment, the lighting system comprising:
   at least one controllable light source for generating a light with at least one controllable light parameter;
   at least one light sensor for detecting a current lighting level in the environment; and
   a control unit for controlling the at least one light source, wherein the control unit is configured to:
      evaluate sensor data received from the at least one light sensor for determining a current daylight level relevant for the environment;
      control the at least one controllable light source based on a predefined human-centric lighting (HCL) target curve, which specifies a temporal progression of lighting parameters, and the determined current daylight level, so that a resulting lighting level in the illuminated environment comes close to the HCL target curve; and
      determine a usable portion of currently available daylight and control the at least one controllable light source based on the determined usable portion of the currently available daylight.

2. The lighting system according to claim 1, wherein the control unit is further configured to substantially continuously adjust a target lighting level to be generated by the at least one controllable light source based on the determined current daylight level.

3. The lighting system according to claim 1, wherein the control unit is further configured to calibrate the at least one light sensor based on the sensor data recorded at different lighting levels.

4. The lighting system according to claim 1, wherein the control unit is further configured to evaluate the sensor data taking into account a spectral characteristic of the at least one light sensor.

5. The lighting system according to claim 1, wherein:
   the at least one controllable light source comprises:
      at least one cool white light source having a first color temperature; and
      at least one warm white light source having a second color temperature; and
   the control unit is further configured to approximate a correlated color temperature dependency of the at least one light sensor between the first color temperature and the second color temperature as a linear function of color temperature.

6. A method for illuminating an environment utilizing a lighting system, the method comprising:
   reading a first target value from a predefined human-centric lighting (HCL) target curve to determine a first target lighting level at a first time point;
   detecting a current lighting level in the environment for determining a currently existing daylight level;
   reading a second target value from the predefined HCL target curve to determine a second target lighting level at a second time point;
   adjusting the second target lighting level taking into account determined currently existing daylight levels;
   controlling at least one light source of the lighting system to adjust the lighting system according to the adjusted second target lighting level; and
   determining a usable portion of currently present daylight;
   wherein adjusting the second target lighting level comprises adjusting the second target lighting level based on the determined usable portion of the currently present daylight.

7. The method according to claim 6, wherein adjusting the second target lighting level taking into account determined current daylight levels comprises:
   subtracting at least one of the determined current daylight levels taking into account the determined usable portion of the currently available daylight from the second target lighting level determined using the predefined HCL target curve.

8. The method of claim 6, wherein:
   at least one of reading the first target value and reading the second target value comprises:
   reading a percentage target value; and
   the method further comprises:
      converting the percentage target value to illuminance.

9. The method according to claim 6, further comprising:
   calibrating at least one light sensor of the lighting system.

10. The method according to claim 6, wherein detecting the current lighting level is performed, at least in part, via at least one light sensor of the lighting system.

11. The method according to claim 6, wherein the lighting system comprises:
   at least one controllable light source;
   at least one light sensor configured for detecting a current lighting level in the environment; and
   a control unit for controlling the at least one controllable light source.

* * * * *